July 25, 1950  W. J. TULL ET AL  2,516,356
AUTOMATIC RANGE TRACKING AND MEMORY CIRCUIT
Filed Oct. 13, 1944  3 Sheets-Sheet 3

Inventors
WILLIAM J. TULL
WARREN PROCTOR
By W. Glenn Jones
Attorney

Patented July 25, 1950

2,516,356

UNITED STATES PATENT OFFICE 2,516,356

AUTOMATIC RANGE TRACKING AND MEMORY CIRCUIT

William J. Tull, Cambridge, Mass., and Warren Proctor, Long Beach, Calif., assignors, by mesne assignments, to the United States of America as represented by the Secretary of the Navy Application October 13, 1944, Serial No. 558,576

17 Claims. (Cl. 343—7)

This invention relates to a radio echo detection system and particularly to a method of and a means for tracking in range a selected object, principally when the radio echo apparatus is moving toward the object or vice versa at a substantially constant rate.

This invention finds particular utility in a radio-echo system where angle tracking is employed, i. e. wherein an object is tracked in both azimuth and elevation. In general, angle tracking is accomplished by means of a rotating offset paraboloid antenna system, which has the axis of the paraboloid tilted at a small angle to the axis of rotation. In operation the axis of antenna rotation is first directed at the object (i. e. pointed so that it coincides with the line-of-sight to the object) so that the energy beam from the antenna will circumscribe the object during a cycle of rotation. Now then as the object moves the line-of-sight thereto will no longer coincide with the axis of antenna rotation which thus causes varying amounts of reflected energy to be received thereby during a cycle at paraboloid rotation. The variation in received energy is sinusoidal occurring at the frequency of antenna rotation.

The thus modulated energy is then detected and is representative of an error signal which in general is applied as an input to known apparatus for moving the orientation of the antenna rotation axis back into coincidence with the line-of-sight to the object. By the apparatus of this invention the receiver is gated, i. e. rendered responsive by use of a delayed gate applied at a time coincident with the arrival of a reflected pulse from a selected object thereby to permit the generation of an error voltage to take place solely with respect to the selected object. Hence by use of the invention angle tracking will occur only on the selected object. Furthermore, the invention is provided with what will hereinafter be known as a "memory circuit" which automatically pushes the gating pulse in range in accordance with the rate of approach of the radio echo receiver to the object so that if for some reason the echo signal is lost the gate will continue to change phase at the proper rate so as to lie in time coincidence with the echo signal when it returns.

One novel application of the invention can be found in the patent application of D. T. Griggs and Britton Chance entitled "Method of and Means for Guiding a Missile," S. N. 574,438, filed January 18, 1945, as a means for aiding the steering of a guided missile of the type disclosed therein. Or it could be used in bomber type aircraft for obtaining rate of approach information used in making computations on bombing runs.

It is an object of the present invention to provide a means for generating a variable time phase gating pulse which is adapted to render a radio echo receiver responsive at a time coincident with the arrival of a reflected energy pulse from a selected object.

It is another object of the present invention to provide a means for generating a variable time phase gating pulse which is adapted to render a radio echo receiver responsive at a time coincident with the arrival of a reflected energy pulse from a selected object and to provide means for automatically closing said gating pulse in range in accordance with the rate of approach of said receiver to said object.

It is another object of this invention to provide a means for generating a variable time phase gating pulse of the foregoing type with means for altering the movement thereof so as to correct its lagging or leading the arrival of the reflected energy pulse.

Other objects and features of the present inventoin will become apparent upon a careful consideration of the following detailed description when taken with the accompanying drawings.

Fig. 2 is a circuit diagram showing in greater detail the arrangement shown in Fig. 1.

Figure 1:
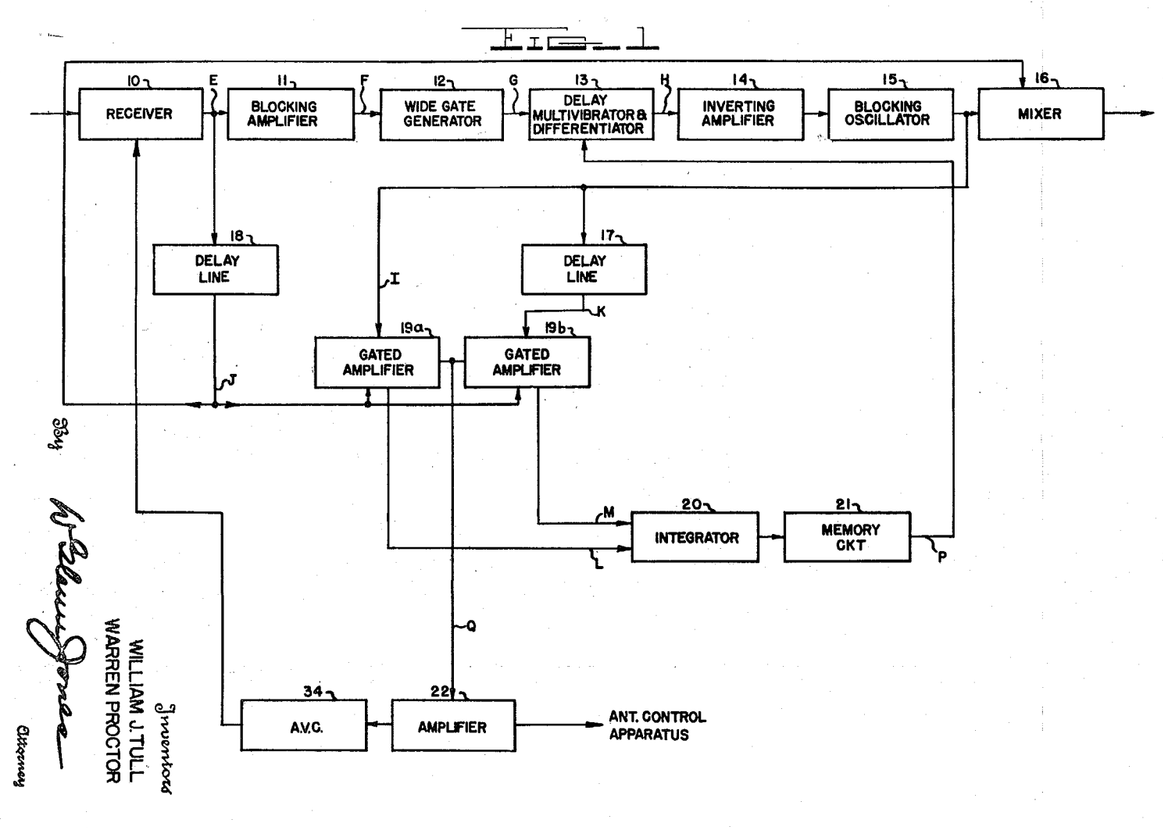
Fig. 1 is a simplified block diagram showing in general the circuit organization of the invention.

The manner in which the present invention gates the receiver so as to admit only echo signals from a selected object may be seen upon reference to Fig. 1. The received signals are first applied through delay line 18 to a pair of parallel amplifier channels 19a and 19b which are normally held inoperative or blocked except during the instant that a gating pulse obtained respectively from a blocking oscillator 15 and delay line 17 is applied to them. These gates overlap slightly in time as will be seen hereinafter and are delayed from the emission of the transmitted pulse by the proper amount of time, through adjustment of the delay multivibrator 13, so as to center the echo signal with the mid-point of the overlapping areas to thereby cause equal amounts of echo energy to pass through each amplifier channel.

In gating such an amplifier two conditions must be satisfied; first, the gates must be made adjustable in time so that the operator may center the selected echo signal with the mid-point of the overlapping area, and second, the gates must track, that is, keep themselves automatically "locked on" the selected echo signal as the receiver approaches the object or vice versa.

Before proceeding with the manner in which an object or target is tracked in range it is deemed desirable to describe the method of controlling the gates in time with respect to the emission of the transmitted pulse. The main signal from the transmitter 6 is first detected by a superheterodyne receiver 10 in the usual way and triggers, in a manner to be described hereinafter, the delay multivibrator 13 which in turn produces a controllable time duration pulse the trailing edge of which keys off a gate generating blocking oscillator 15. The time duration of the pulse from the delay multivibrator 13 depends upon the D. C. bias applied to the control grid of one of the tubes. Adjustments of this bias from approximately plus 10 volts to plus 35 volts phases the production of the blocking oscillator pulse from 1 to 160 microseconds after the detection of the transmitted pulse which corresponds to ranges of 1 to 15 miles respectively. For range tracking purposes the memory circuit 21 is provided, which functions as a long time linear voltage generator and is arranged to provide a linearly varying D. C. bias to the phase adjusting tube of the multivibrator 13 so as to control the production of the blocking oscillator pulse over the above ranges and in accordance with the rate of approach of the receiver to the object.

Thus if the receiver traveled toward the object with uniform velocity and the circuits were perfect, the memory circuit 21 alone would suffice for tracking the echo with the gates. Unfortunately neither of these conditions exist in actual practice so that an additional circuit, integrator 20, is needed in order to "trim" the memory circuit one way or another as the delayed gates begin to lag or lead the echo signal.

Figure 3:
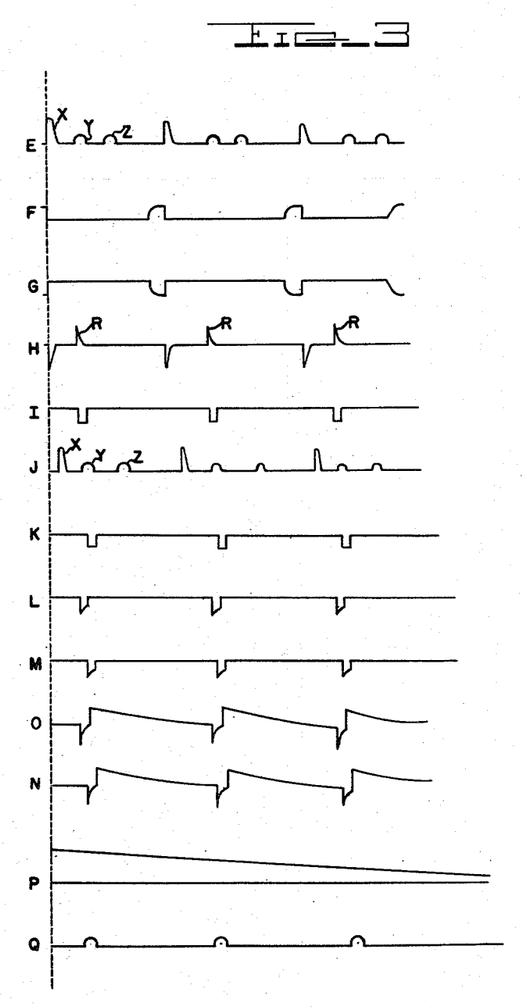
Fig. 3 is a series of voltage time plots which are representative of certain changes in voltage which occur at correspondingly designated points in the apparatus shown in Figs. 1 and 2 during a normal cycle of operation thereof.

A complete detailed description of the invention will follow in connection with Figs. 2 and 3 and with occasional reference to Fig. 1. The receiver 10 which is coupled together with the transmitter 6 to a single antenna 7 by coupling means 8 known to the art, presents an output or an input to the object selecting circuit as shown in plot E of Fig. 3 comprising the transmitted signal X, a reflected signal Y which it is desired to track and another reflected signal Z which is to be excluded but nevertheless occurs in the output of the receiver. These signals are applied through condenser 25 to the grid of the blocking amplifier 11 which has a plate load resistance 24 which also serves as grid return resistance for tube 12b of the wide gate generating circuit 12. This latter arrangement is a two tube affair known as a positive grid multivibrator which is adapted to respond to the operation of the blocking amplifier 11 and is arranged to produce a pulse of a time length which is slightly less than the interval elapsing between transmitted pulses. The blocking amplifier is biased normally below cut-off by means of a negative grid voltage applied as indicated at 26 so that it will only respond, for example, to signals of 25 volts amplitude or more. Thus when the transmitted pulse X— is applied to this tube the cut-off bias is overcome and the tube conducts thereby driving the grid end of resistance 24 sharply negative as indicated in plot F of Fig. 3 to initiate the generation of the wide gate pulse, whereupon current commences to flow through resistance 24 to charge condenser 23, thus holding tube 12b blocked until condenser 23 charges to a point to overcome the cathode bias on this tube caused by the voltage developed across the cathode resistance during the time that 12a is conducting. The time length of the wide gate pulse is thus seen to be a function of the charging time of condenser 23 through resistance 24. During this period the plate potential on blocking amplifier 11 is seen to be reduced by the flow of charging current into the condenser 23 so that it will not respond to signals following the detection of the transmitted pulse.

The output from the wide gate generating circuit 12 as taken from the plate of tube 12b is a positive rectangular gate as shown at G in Fig. 3 is differentiated by the condenser 27, inductance 28 and resistance 29 and applied as a trigger pulse to the grid of the tube 13a of the delay multivibrator 13. This multivibrator immediately generates a pulse in response to the leading edge of G and in the same manner as multivibrator 12 but of a time length determined by the bias on the grid of tube 13a. Production of the variable delay gate pulse and consequently triggering pulse for the blocking oscillator is as follows: tube 13b is normally conducting by reason of its grid return to B+ through resistance 33 so that when tube 13a is triggered by the leading edge of the positive voltage G from the plate of 12b the grid of 13b is driven negative by the drop in plate voltage on tube 13a to thereby render 13b non-conducting. Since the grids of tube 13b and 13a are returned respectively to B+ and approximately ground the multivibrator cathode current is greater when 13b is conducting than when 13a is conducting. Consequently when the multivibrator is set into operation in response to the leading edge of G the net cathode current will decrease and a negative pulse will appear across the inductance 31. The time length required for the multivibrator to recover to its quiescent state is governed by resistance 33, capacitor 32, and the D. C. bias on the grid of 13a. The higher the bias on tube 13a the greater the voltage drop across the cathode resistance 30 when it is conducting and hence the longer it takes for condenser 32 to charge to a value sufficient to restore conduction to tube 13b. As will be described hereinafter the memory circuit 21 supplies tube 13a with a linearly decreasing bias which shortens correspondingly the length of the pulse generated by the multivibrator 13. As indicated the leading edge of the wide gate pulse G which furnishes the keying pulse for the delay multivibrator 13 produces a negative pip across inductance 31 as shown in plot H, while the trailing edge of the delay multivibrator pulse produces a positive pip R across the inductance 31 by reason of an increase in cathode current caused when tube 13b returns to conduction. The positive pulse serves as a trigger for the inverting amplifier 14 which has its plate tied to the plate winding of the blocking oscillator transformer 36 and its grid biased normally below cut-off as indicated at 35 so that it will not respond to negative inputs. In this manner the inverting amplifier draws a surge of current through the blocking oscillator transformer 36 in response to the positive pip R shown in plot H to set the blocking oscillator 15 into operation. Blocking oscillator 15 in turn is biased normally non-conducting by potentiometer 38 so that it produces a pulse only in response to the positive trigger from the inductance 31. In this manner the blocking oscillator generates for instance a .6 microsecond negative pulse of about 50 volts in amplitude as shown in plot I which in turn is fed through lead 39 and attenuator 40 to the cathode of the gated amplifier 19a and then after being delayed .4 microsecond by delay line 17 is applied as the delayed pulse K to the cathode of the gating amplifier 19b. In this way the gated amplifier 19 will be properly opened to receive and pass a 1 microsecond pulse, i. e. counting from the time that the first blocking oscillator pulse is applied to the gated amplifier 19, tube 19a is opened from 0–.6 microsecond and tube 19b is opened from .4–1 microsecond. It must be noted, however, that the figures just quoted are used solely for the purpose of illustration and that the time length of the blocking oscillator gating pulse is regulated in accordance with the time length of the transmitted pulse, i. e. the total time that both sections of the gated amplifier is opened should normally be equal to or slightly less than the transmitted pulse. Attenuator 40 provides a means for equalizing the amplitudes of the blocking oscillator pulses applied to the respective cathodes of the gating amplifier 19 and hence their effect thereon by compensating for the inherent attenuation in delay line 17. The output of the receiver is then applied in parallel to both grids of the gated amplifier 19 through delay line 18 and amplifier 41. The latter delay line compensates for the inherent delay in the foregoing pulse generating circuits as shown in plot J of Fig. 3 and also enables the blocking oscillator gates to follow the echo signal down farther in range since the width of the gates would limit the lowest tracking in range without this line.

In operation the gated amplifier has the grids of both sections biased below cut-off, say —60 volts by way of a negative grid bias as indicated at 42, so that no video signal (maximum of about 30 volts) will pass except during the application of the overlapping negative 50 volt signals applied to their cathodes. If the timing of the .6 microsecond blocking oscillator pulse and its .4 microsecond delayed mate is correctly centered with respect to the selected echo signal; that is, so the video signal is centered in time with the mid-point of the overlapping area of the gates, then equal amounts of the echo signal will pass through both sections of the amplifier 19. This being the case, equal voltages will be developed across the respective plate resistances 42 and 43 of tubes 19a and 19b. An echo signal Q from the selected object alone is then obtainable from the transformer 65 disposed in the plate circuit of the gated amplifier 19 and may be fed on to a cathode ray tube indicator for purposes of indicating range and/or to suitable known control apparatus for training the antenna on the selected object. It may be also fed through an amplifier 22 to an A. V. C. circuit 34 for controlling the gain of the receiver in the usual manner. Should the blocking oscillator pulse occur later than the instant required then tube 19a will conduct more energy than tube 19b since a greater portion of the video signal will lie in time coincidence with the early gate I. The pulse outputs from each section of the gated amplifier 19 is taken from the respective plate circuits and applied through condensers 44 and 45 to the integrator 20. The function of the integrator is one of comparing the relative amounts of video signal passed by each section of the gated amplifier and for providing a corrective signal to the delay multivibrator 13 to control the pulse length thereof such that the overlapping gates produced by the blocking oscillator and the delay line 17 will be correctly timed to properly center the video signal.

The integrating circuit consists of a pair of "pulse stretchers" comprising diodes 46a and 46b and condensers 44 and 45 with a pair of serially connected amplifiers 20a and 20b to the mid-point of which is connected a storage condenser 47. The diodes are connected across the inputs to the two series amplifiers with the cathode of the diodes connected to the respective grids. The input to these two amplifiers are a pair of negative overlapping pulses as shown in L and M of Fig. 3 which short circuit the respective diodes to first charge condenser 45 and then condenser 44. Consider for instance the upper half of this circuit including condenser 44 and point N. During the negative pulse M diode 46a conducts to discharge condenser 44. The amplitude of this pulse depends upon the amount of the video signal embraced by the gate K and will therefore determine the amount of charge condenser 44 accrues. At the termination of the pulse, point N will jump positive as indicated at N in Fig. 3 by the voltage on condenser 44 so as to cause tube 20a to conduct, after which condenser 44 begins a slow exponential discharge through resistance 48 to hold tube 20a conducting and hence tends to discharge condenser 47 positive. In a similar fashion tube 46b discharges condenser 45 to hold point O positive as indicated in plot O of Fig. 3 which in turn renders tube 20b conducting which thus tends to discharge condenser 47. As a result condenser 47 assumes an average or integrated charge when the output signals from both sections of the gated amplifier 19 are equal. If, however, the overlapping gates should occur later than that required then the gates are not tracking fast enough, in which case the output from 19a will exceed that from 19b so that condenser 47 or the mid-point 50 between the series amplifiers will go negative with respect to its normal voltage, which drop in voltage is applied to the memory circuit 21, in a manner hereinafter described to correct the slope of the automatic tracking voltage applied to the delay multivibrator 13.

As previously mentioned it is the function of the memory circuit to provide the delay multivibrator 13 with a linearly decreasing bias so that the time interval elapsing between the detection of the transmitted pulse and the generation of the output pulse from the blocking oscillator (as controlled by the time duration of the delay multivibrator pulse) will be decreasing at approximately the same rate as the rate of approach of the receiver to the object. This circuit consists of a pair of interconnected cathode followers 21a and 21b which applies the output of 21b as taken at point P from the cathode thereof through lead 66 to the control grid of the delay multivibrator tube 13a. The cathode of tube 21a is coupled through resistance 52 to the grid of 21b while the cathode of the latter is fed back onto the grid of 21a through resistance 55 and condenser 54. In operation, before automatic range tracking is set into effect, the operator adjusts the bias of the multivibrator tube 13a so as to properly center the gates with respect to the selected video signal. This adjustment is performed by closing switch 56 to operate relay 57 which in turn shorts out resistance 52 with resistance 58 and connects the grid of 21a to a "slewing" potentiometer 59. This latter potentiometer has a positive voltage connected thereacross and is adjusted until tube 21a is passing current of a value sufficient to charge condenser 53 and consequently raise the voltage at point P in the cathode circuit of tube 21b to provide a multivibrator 13 with the proper bias to center the selected echo signal. The propriety of this adjustment may best be observed by applying the delayed output of the receiver, as taken from the amplifier tube 41, and the blocking oscillator pulse taken from lead 61, to a cathode ray tube indicator through a cathode follower mixer stage 16, for instance. In this way slewing potentiometer 59 may be adjusted until the gate lies in time coincidence with the echo signal. Once this adjustment has been made switch 56 can be opened to start the operation of the memory circuit, at the beginning of a bombing run, for instance. Condenser 53 then starts to discharge through resistances 52 and 62 to thus reduce the potential on the grid of 21b thus causing a near corresponding reduction of potential on its cathode which in turn is fed through condenser 54 and resistance 55 to the grid of 21a. Therefore, as the condenser 53 discharges the potential on the grid at 21b and also the cathode of 21a tend to decrease exponentially, but since the voltage from the cathode of 21b is fed back through condenser 54 and resistance 55 to the grid of tube 21a the cathodes of both tubes will decrease in a like manner and amount. In this manner the potential drop observed across resistance 52 will be constant to thus cause a linear discharge of condenser 53 with point P in the cathode circuit of tube 21b to decrease linearly from its initial value as set by the slewing potentiometer 59 as indicated in plot P of Fig. 3. In the event that the memory circuit does not cause proper tracking of the video signal the mid-point 50 of the series amplifiers 20a and 20b will rise or fall to thus ignite the neon lamp 51 and thereby provide an error signal to the grid of tube 21a in the memory circuit. Such an error signal appears instantaneously at point P and hence at the delay multivibrator 13. For example, in a previous case it was assumed that the gating pulses were lagging the echo signal thus causing the drop in plate potential of tube 19a to exceed that of 19b. In this condition tube 20b will be more strongly conducting than 20a by reason of the increased charge on condenser 45 so that the potential at mid-point 50 will drop to thus ignite the neon bulb 51, or similar glow discharge device and thereby insert a small negative discontinuity on the tracking voltage P. If this lumped correction does not remedy the tracking error, the neon-bulb will continue to fire to thereby provide a series of discontinuities in the tracking voltage until an effective change in the slope of the tracking voltage has been established. Thus it is seen that the present range tracking device does not only provide remedy for lumped errors in tracking but also compensates for changes in the rate of approach by effectively changing the slope of the tracking voltage. Stating it differently the "memory circuit" may be looked upon as a means for simulating the rate-of-approach while the integrator provides a means for trimming the simulated rate-of-approach to conform to the true rate-of-approach. Further-more, in the event that the echo signals should fail the memory circuit will maintain the gates closing in range at approximately the same rate as the receiver's rate of approach to the object so that when the echo signals return they will fall in near time phase coincidence with the gating pulses. The neon bulb 51 serves as a means for isolating small and insignificant variations in potential at point 50 from the memory circuit in that it requires about a 30 volt error signal for breakdown. On the other hand the circuits are so designed as to provide a 30 volt signal at small tracking errors.

Although we have shown and described only a certain and specific embodiment of the present invention we are fully aware of the many modifications possible thereof. Therefore, this invention is not to be limited except insofar as is necessitated by the prior art and the spirit of the appended claims.

We claim:

1. In a radio echo system having a pulse transmitter which is adapted to emit a sequential series of pulses in the form of a unidirectional energy beam and a receiver for detecting energy reflected from remote objects, a means for tracking in range a selected echo signal in accordance with the rate of receiver approach to the object producing the echo signal, comprising a multivibrator of the type which is adapted to produce a controllable time duration pulse in response to the amplitude of the bias on the control grid of one of the multivibrator tubes, means keying said multivibrator in response to said transmitted pulse, a blocking oscillator arranged to produce a fixed time duration pulse, means keying said blocking oscillator in response to the trailing edge of said multivibrator pulse, a pair of amplifying channels connected in parallel, means applying the output of said receiver to said amplifying channels, means for producing a linearly varying voltage having a slope which approximates said rate of approach, means applying said voltage to the said control grid of said multivibrator, means applying a portion of said blocking oscillator pulse to one of said amplifying channels to render the same operative thereby, means delaying the remaining portion of said blocking oscillator pulse and applying it to the other of said channels to render the same operative thereby, means adjusting the initial amplitude of said linearly varying voltage so that said blocking oscillator pulse will be correctly timed to permit the passage of equal amounts of echo signal from a selected object through each of said amplifying channels, and means for altering the slope of said linearly varying voltage from time to time in response to a difference in echo signal output from said amplifying channels.

2. In a radio echo system having a pulse transmitter which is adapted to emit a sequential series of pulses in the form of a unidirectional energy beam and a receiver for detecting energy reflected from remote objects, a means for tracking in range a selected echo signal in accordance with the rate of receiver approach to the object producing the echo signal, comprising a multivibrator of the type which is adapted to produce a controllable time duration pulse in response to the amplitude of the bias on the control grid of one of the multivibrator tubes, means keying said multivibrator in response to said transmitted pulse, a blocking oscillator arranged to produce a fixed time duration pulse, means keying said blocking oscillator in response to the trailing edge of said multivibrator pulse, a pair of amplifying channels connected in parallel, means applying the output of said receiver to said amplifying channels, means for producing a linearly varying voltage having a slope which approximates said rate of approach, means applying said voltage to the said control grid of said multivibrator, means applying a portion of said blocking oscillator pulse to one of said amplifying channels to render the same operative thereby, means delaying the remaining portion of said blocking oscillator pulse and applying it to the other of said channels to render the same operative thereby, means adjusting the initial amplitude of said linearly varying voltage so that said blocking oscillator pulse will be correctly timed to permit the passage of equal amounts of echo signal from a selected object through each of said amplifying channels, means comparing the amount of echo signal passed by each of said amplifying channels, and means for altering the slope of said linearly varying voltage in sense and amount in response to the difference in echo signal energy passed by said channels so as to change the timing of said blocking oscillator pulse and thereby equalize the energy passed by each of said channels.

3. In a radio echo system having a pulse transmitter which is adapted to emit a sequential series of pulses in the form of a unidirectional energy beam and a receiver for detecting energy reflected from remote objects, a means for tracking in range a selected echo signal in accordance with the rate of receiver approach to the object producing the echo signal, comprising a first generator for producing a pulse whose time duration is controllable in response to a bias voltage applied thereto, a means for keying said first pulse generator in response to said transmitted pulse, a second generator for producing a pulse of fixed time duration, means keying said second pulse generator in response to the trailing edge of the output from said first generator, a pair of amplifying channels connected in parallel, means applying the output of said receiver to both of said channels, means for producing a linearly varying voltage having a slope which approximates said rate of approach, means applying said voltage to said first pulse generating means for controlling the time duration of the output pulse therefrom, means applying a portion of the output of said second pulse generator to one of said amplifying channels to render the same operative thereby, means delaying the remaining portion of the output of said second pulse generator by an amount less than the time duration thereof and applying it to the other one of said amplifying channels to render it operative, means adjusting the initial amplitude of said linearly varying voltage so that the pulse output from the second pulse generator will be correctly timed to permit the passage of equal amounts of echo signal from said selected object through each of said amplifying channels, and means for altering the slope of said linearly varying voltage in response to a difference in echo signal output from said amplifying channels.

4. In a radio echo system having a pulse transmitter which is adapted to emit a sequential series of pulses in the form of a unidirectional energy beam and a receiver for detecting energy reflected from remote objects, a means for tracking in range a selected echo signal in accordance with the rate of receiver aproach to the object producing the echo signal, comprising a first generator for producing a pulse whose time duration is controllable in response to a bias voltage applied thereto, a means for keying said first pulse generator in response to said transmitted pulse, a second generator for producing a pulse of fixed time duration, means keying said second pulse generator in response to the trailing edge of the output from said first generator, a pair of amplifying channels connected in parallel, means applying the output of said receiver to both of said channels, means for producing a linearly varying voltage having a slope which approximates said rate of approach, means applying said voltage to said first pulse generating means for controlling the time duration of the output pulse therefrom, means applying a portion of the output of said second pulse generator to one of said amplifying channels to render the same operative thereby, means delaying the remaining portion of the output of said second pulse generator by an amount less than the time duration thereof and applying it to the other one of said amplifying channels to render it operative, means adjusting the initial amplitude of said linearly varying voltage so that the pulse output from the second pulse generator will be correctly timed to permit the passage of equal amounts of echo signal from said selected object through each of said amplifying channels, means comparing the amount of echo signal passed by each of said amplifying channels, and means altering the slope of said linearly varying voltage in sense and amount in response to the difference in echo signal energy passed by each of said channels so as to change the timing of said output from said second pulse generator to thereby equalize the energy passed by each of said channels.

5. In a radio echo system having a pulse transmitter which is adapted to emit a sequential series of pulses in the form of a unidirectional energy beam and a receiver for detecting energy reflected from remote objects, a means for tracking in range a selected echo signal in accordance with the rate of receiver approach to the object producing the echo signal, comprising a first generator for producing a pulse whose time duration is controllable in response to a bias voltage applied thereto, a means for keying said first pulse generator in response to said transmitted pulse, a second pulse generator adapted to produce a pair of overlapping gating pulses, means keying said second pulse generator in response to the trailing edge of the output from said first generator, a pair of amplifying channels connected in parallel, means applying the output of said receiver to both of said channels, means for producing a linearly varying voltage having a slope which approximates said rate of approach, means applying said voltage to said first pulse generating means for controlling the time duration of the output pulse therefrom, means applying the first gating pulse of said overlapping pair to one of said amplifying channels to render the same operative thereby, means applying the second gating pulse of said overlapping pair to the other one of said amplifying channels to render it operative, means adjusting the initial amplitude of said linearly varying voltage so that the pulse output from the second pulse generator will be correctly timed to permit the passage of equal amounts of echo signal from said selected object through each of said amplifying channels, and means for altering the slope of said linearly varying voltage in response to a difference in echo signal output from said amplifying channels.

6. In a radio echo system having a pulse transmitter which is adapted to emit a sequential series of pulses in the form of a unidirectional energy beam and a receiver for detecting energy reflected from remote objects, a means for tracking in range a selected echo signal in accordance with the rate of receiver approach to the object producing the echo signal, comprising a first generator for producing a pulse whose time duration is controllable in response to a bias voltage applied thereto, a means for keying said first pulse generator in response to said transmitted pulse, a second pulse generator adapted to produce a pair of overlapping gating pulses, means keying said second pulse generator in response to the trailing edge of the output from said first generator, a pair of amplifying channels connected in parallel, means applying the output of said receiver to both of said channels, means for producing a linearly varying voltage having a slope which approximates said rate of approach, means applying said voltage to said first pulse generating means for controlling the time duration of the output pulse therefrom, means applying the first gating pulse of said overlapping pair to one of said amplifying channels to render the same operative thereby, means applying the second gating pulse of said overlapping pair to the other one of said amplifying channels to render it operative, means adjusting the initial amplitude of said linearly varying voltage so that the pulse output from the second pulse generator will be correctly timed to permit the passage of equal amounts of echo signal from said selected object through each of said amplifying channels, means comparing the amount of echo signal passed by each of said amplifying channels, and means altering the slope of said linearly varying voltage in sense and amount in respose to the difference in echo signal energy passed by each of said channels so as to change the timing of said output from said second pulse generator to thereby equalize the energy passed by each of said channels.

7. In a radio echo system having a pulse transmitter which is adapted to emit a sequential series of pulses in the form of a unidirectional energy beam and a receiver for detecting energy reflected from remote objects, a means for tracking in range a selected echo in accordance with the rate of receiver approach to the object producing the echo signal, comprising a first generator for producing a pulse whose time duration is controllable in response to a bias voltage applied thereto, a means for keying said first pulse generator in response to said transmitted pulse, a second generator for producing a pulse of fixed time duration, means keying said second pulse generator in response to the trailing edge of the output from said first generator, a pair of amplifying channels connected in parallel, means delaying the output from said receiver and applying it to both of said channels, means for producing a linearly varying voltage having a slope which approximates said rate of approach, means applying said voltage to said first pulse generating means for controlling the time duration of the output pulse therefrom, means applying a portion of the output of said second pulse generator to one of said amplifying channels to render the same operative thereby, means delaying the remaining portion of the output of said second pulse generator by an amount less than the time duration thereof and applying it to the other one of said amplifying channels to render it operative, means adjusting the initial amplitude of said linearly varying voltage so that the pulse output from the second pulse generator will be correctly timed to permit the passage of equal amounts of echo signal from said selected object through each of said amplifying channels, and means for altering the slope of said linearly varying voltage in response to a difference in echo signal output from said amplifying channels.

8. In a radio echo system having a pulse transmitter which is adapted to emit a sequential series of pulses in the form of a unidirectional energy beam and a receiver for detecting energy reflected from remote objects, a means for tracking in range a selected echo signal in accordance with the rate of receiver approach to the object producing the echo signal, comprising a first generator for producing a pulse whose time duration is controllable in response to a bias voltage applied thereto, a means for keying said first pulse generator in response to said transmitted pulse, a second generator for producing a pulse of fixed time duration, means keying said second pulse generator in response to the trailing edge of the output from said first generator, a pair of amplifying channels connected in parallel, means delaying the output from said receiver and applying it to both of said channels, means for producing a linearly varying voltage having a slope which approximates said rate of approach, means applying said voltage to said first pulse generating means for controlling the time duration of the output pulse therefrom, means applying a portion of the output of said second pulse generator to one of said amplifying channels to render the same operative thereby, means delaying the remaining portion of the output of said second pulse generator by an amount less than the time duration thereof and applying it to the other one of said amplifying channels to render it operative, means adjusting the initial amplitude of said linearly varying voltage so that the pulse output from the second pulse generator will be correctly timed to permit the passage of equal amounts of echo signal from said selected object through each of said amplifying channels, means comparing the amount of echo signal passed by each of said amplifying channels, and means altering the slope of said linearly varying voltage in sense and amount in response to the difference in echo signal energy passed by each of said channels so as to change the timing of said output from said second pulse generator to thereby equalize the energy passed by each of said channels.

9. In a radio echo system having a pulse transmitter which is adapted to emit a sequential series of pulses in the form of a undirectional energy beam and a receiver for detecting energy reflected from remote objects, a means for tracking in range a selected echo signal in accordance with the rate of receiver approach to the object producing the echo signal, comprising a first generator for producing a pulse whose time duration is controllable in response to a bias voltage applied thereto, a means for keying said first pulse generator in response to said transmitted pulse, a second generator for producing a pulse of fixed time duration, means keying said second pulse generator in response to the trailing edge of the output from said first generator, a pair of amplifying channels connected in parallel, means applying the output of said receiver to both of said channels, means for producing a linearly varying voltage having a slope which approximates said rate of approach, means applying said voltage to said first pulse generating means for controlling the time duration of the output pulse therefrom, means applying a portion of the output of said second pulse generator to one of said amplifying channels to render the same operative thereby, means delaying the remaining portion of the output of said second pulse generator by an amount less than the time duration thereof and applying it to the other one of said amplifying channels to render it operative, means adjusting the initial amplitude of said linearly varying voltage so that the pulse output from the second pulse generator will be correctly time to permit the passage of equal amounts of echo signal from said selected object through each of said amplifying channels, means comparing the amount of echo signal passed by each of said channels and adapted to produce an output determined in sense and amplitude by which channel passes the most echo energy and the difference respectively, and a neon bulb coupling the output of said energy comparing means to said means for generating a linearly varying voltage for altering the slope of the same so as to correct the timing of the pulse output from the second pulse generator to thereby equalize the amount of echo signal passed by each of said channels.

10. In a radio echo system having a pulse transmitter which is adapted to emit a sequential series of pulses in the form of a unidirectional energy beam and a receiver for detecting energy reflected from remote objects, a method of tracking in range a selected echo signal in accordance with the rate-of-receiver approach to the object producing the echo signal, which comprises producing a pair of overlapping gating pulses in response to said transmitted pulse but delayed in time therefrom, generating a long time linearly varying voltage having a slope which approximates said rate of approach, controlling the delay between said transmitted pulse and said overlapping gating pulses in accordance with the amplitude of said linearly varying voltage, and altering the slope of said linearly varying voltage by an amount and sense depending upon the relative time occurrences of said gates and said echo signal until equal amounts of said echo signal energy lie in time coincidence with each of said overlapping gating pulses.

11. In a radio echo system having a pulse transmitter which is adapted to emit a sequential series of pulses in the form of a unidirectional energy beam, and a receiver for detecting energy reflected from remote objects, a means for tracking in range a selected echo signal in accordance with the rate-of-receiver approach to the object producing the echo signal, comprising means for producing a pair of overlapping gating pulses in response to said transmitted pulse but delayed in time therefrom, means generating a long time linearly varying voltage having a slope which approximates said rate of approach, means controlling the delay between said transmitted pulse and said overlapping gating pulses in accordance with the amplitude of said linearly varying voltage, means initially adjusting the amplitude of said voltage so that the overlapping portion of said gating pulses centers in time said selected echo signal, and means altering the slope of said linearly varying voltage in response to the lagging or leading of said echo signal relative to said overlapping portion of said gating pulses thereby to maintain said overlapping portion of said gates properly centering said echo signal.

12. In a radio echo detection system having a pulse transmitter which is adapted to emit a sequential series of pulses in the form of a unidirectional energy beam and a receiver for detecting energy reflected from remote objects, a method of tracking in range a selected echo signal in accordance with the rate-of-receiver approach to the object producing the echo signal, which comprises the steps of producing a pair of overlapping gating pulses in response to said transmitted pulse but delayed in time therefrom, generating a long time linearly varying voltage having a slope which approximates said rate of approach, controlling the delay between said transmitted pulse and said overlapping gating pulses in accordance with the amplitude of said linearly varying voltage, producing a first signal having an energy content proportional to the time coincidence of said echo signal with one of said gating pulses, producing a second signal having an energy content proportional to the time coincidence of said echo signal with the other of said gating pulses, comparing the amount of energy in said first and second signals and altering the slope of said linearly varying voltage in accordance with the difference therebetween so that equal amounts of echo signal will lie in time coincidence with each of said gating pulses, thereby equalizing said first and second signals.

13. In a radio echo detection system having a pulse transmitter which is adapted to emit a series of pulses, and a receiver for detecting energy received from remote objects, apparatus for tracking in range a selected echo signal in accordance with the rate-of-receiver approach to the object producing the echo signal, said apparatus comprising means for producing a pair of overlapping gating pulses in response to said transmitted pulse but delayed in time therefrom, means generating a linearly varying voltage having a slope which approximates said rate of approach, means controlling the delay between said transmitted pulse and said overlapping gating pulses in accordance with the amplitude of said linearly varying voltage, and means altering the slope of said linearly varying voltage in response to the lagging or leading of said echo signal relative to said overlapping portion of said gating pulses.

14. In a radio echo detection system having a pulse transmitter which is adapted to emit a series of pulses, and a receiver for detecting energy reflected from remote objects, apparatus for tracking in range a selected echo signal in accordance with the rate-of-receiver approach to the object producing the echo signal, said apparatus comprising, means generating a pair of overlapping gating pulses in response to said transmitted pulse but delayed in time therefrom, means generating a linearly varying voltage having a slope which approximates said rate of approach, means controlling the delay between said transmitted pulse and said overlapping gating pulses in accordance with the amplitude of said linearly varying voltage, amplifier means producing a first signal having an energy content proportional to the time coincidence of said echo signal with one of said gating pulses and a second signal having an energy content proportional to the time coincidence of said echo signal with the other of said gating pulses, and means responsive to said first and second signals for altering the slope of said linearly varying voltage.

15. In a radio echo detection system having a pulse transmitter adapted to emit a series of pulses and a receiver for detecting energy reflected from remote objects, apparatus for tracking in range a selected echo signal in accordance with the rate-of-receiver approach to the object producing the echo signal comprising, means for generating a pair of overlapping gating pulses in response to said transmitted pulse but delayed in time therefrom, means controlling the delay between said transmitted pulse and said gating pulses, amplifier means producing first and second signals having energy contents respectively proportional to the time of coincidence of said echo signal with one and the other of said pair of gating pulses, and means responsive to said first and second signals for controlling said delay controlling means so that equal amounts of echo signal will lie in time coincidence with each of said gating pulses thereby to equalize said first and second signals.

16. In a radio echo system wherein a series of pulses are transmitted in the form of an energy beam and a receiver is provided for detecting energy reflected from remote objects, a method of tracking in range a selected reflected signal in accordance with the rate-of-receiver approach to the object reflecting the signal, which comprises the steps of generating a pair of overlapping pulses delayed in time from said transmitted pulse, producing a linearly varying voltage proportional to said rate of approach, controlling the delay between said transmitted pulse and said overlapping pulses in response to the amplitude of said linearly varying voltage, and altering the slope of said linearly varying voltage in accordance with the relative time occurrences of said overlapping pulses and said reflected signal until equal amounts of reflected signal energy lie in time coincidence with each of said overlapping pulses.

17. In a radio echo detecting system wherein a series of pulses are transmitted in the form of an energy beam and a receiver is provided for detecting energy reflected from remote objects, apparatus for tracking in range a selected reflected signal in accordance with the rate-of-receiver approach to the object reflecting the signal, said apparatus comprising means generating a pair of overlapping pulses delayed in time from said transmitted pulse, means generating a linearly varying voltage proportional to said rate of approach, means controlling the delay between said transmitted pulse and said overlapping pulses in accordance with said linearly varying voltage, and means altering the slope of said linearly varying voltage in accordance with the relative time occurrences of said overlapping pulses and said reflected signal until equal amounts of reflected signal energy lie in time coincidence with each of said overlapping pulses.

WILLIAM J. TULL.
WARREN PROCTOR.

REFERENCES CITED

The following references are of record in the file of this patent:

UNITED STATES PATENTS

| Number | Name | Date |
|---|---|---|
| 2,403,975 | Graham | July 16, 1946 |
| 2,433,667 | Hollingsworth | Dec. 30, 1947 |
| 2,445,584 | Ramo | July 20, 1948 |
| 2,455,265 | Norgaard | Nov. 30, 1948 |

Certificate of Correction

Patent No. 2,516,356                                                 July 25, 1950

WILLIAM J. TULL ET AL.

It is hereby certified that error appears in the printed specification of the above numbered patent requiring correction as follows:

Column 2, line 26, for the syllable "ventoin" read *vention*; column 6, line 35, for the word "discharge" read *charge*; column 7, line 10, strike out "a" after *provide*; column 12, line 64, for "producting" read *producing*; column 13, line 15, for "time" read *timed*; column 16, line 6, for "detecting" read *detection*;

and that the said Letters Patent should be read as corrected above, so that the same may conform to the record of the case in the Patent Office.

Signed and sealed this 29th day of May, A. D. 1951.

[SEAL]

THOMAS F. MURPHY,
*Assistant Commissioner of Patents.*